United States Patent

[11] 3,629,506

[72] Inventor Roger Brun
Paris, France
[21] Appl. No. 751,891
[22] Filed Aug. 12, 1968
[45] Patented Dec. 21, 1971
[73] Assignee U.S. Philips Corporation
New York, N.Y.
[32] Priority Aug. 10, 1967
[33] France
[31] 117508

[54] CONTROL DEVICE PARTICULARLY SUITABLE FOR SYNCHRONIZATION SIGNAL GENERATORS FOR TELEVISION
5 Claims, 5 Drawing Figs.

[52] U.S. Cl. ........ 178/69.5DC, 179/15 BS, 325/58
[51] Int. Cl. ........ H04i 7/00
[50] Field of Search ........ 178/69.5 TV, 69.5 G; 179/15; 340/146.1; 325/58

[56] References Cited

UNITED STATES PATENTS

| | | | |
|---|---|---|---|
| 3,493,680 | 2/1970 | Brown | 178/69.5 DC |
| 3,525,808 | 8/1970 | Brown | 178/69.5 DC |
| 3,184,545 | 5/1965 | Leger et al. | 178/69.5 TV |
| 3,368,034 | 2/1968 | Dischert et al. | 178/69.5 DC |
| 3,435,141 | 3/1969 | Hileman et al. | 178/69.5 TV |
| 3,350,644 | 10/1967 | McNair | 325/58 |

*Primary Examiner*—Richard Murray
*Assistant Examiner*—Richard P. Lange
*Attorney*—Frank R. Trifari

ABSTRACT: In a synchronization system for an oscillator, such as a deflection generator for a remote television camera, the oscillator is provided with N output terminals at which oscillations with different phases (N is an integer). The oscillations from the remote camera are compared with the oscillations of a local master oscillator in order to produce digital control signals indicating whether the remote oscillator is lagging or leading. The digital control signals are transmitted to the remote unit to control the opening of gates at the N output terminals of the remote oscillator in order to stop the phase of the remote oscillations. The remote oscillator preferably has a frequency that is a high multiple of the line frequency, and the oscillations are frequency divided at the output of the N output terminals.

INVENTOR.
ROGER BRUN
BY
Frank R. Trifari
AGENT

INVENTOR.
ROGER BRUN
BY
AGENT

INVENTOR.
ROGER BRUN
BY
AGENT

INVENTOR.
ROGER BRUN
BY
Frank R. Jifani
AGENT

INVENTOR.
ROGER BRUN
BY Frank R. Trifari
AGENT

CONTROL DEVICE PARTICULARLY SUITABLE FOR SYNCHRONIZATION SIGNAL GENERATORS FOR TELEVISION

The invention relates to a control device particularly suitable for synchronization signal generators for television, comprising means for controlling the frequency of oscillators and means for establishing the phase of the produced signals, said means being controlled by at least one signal which is formed from the comparison between the signals supplied by a comparison generator and at least one controlled generator, the comparison taking place with a fixed rhythm the period of which is larger than the duration of the transit times of the synchronization signals and the comparison signal by the loop comparison generator-controlled generator.

It is known that the principle of any control of a generator with a comparison generator consists in comparing the information supplied by the two generators, usually in the proximity of the comparison generator, and in supplying to the control device of the controlled generator correction information which usually is proportional to the magnitude of the error. The present invention relates to a control device (or synchronization device) for a generator included in a mobile television reporter camera with a generator placed in a reporting car, which generator itself communicates with the main transmitter. Of course the synchronization of a single camera serves substantially no purpose and although the description below only this simplified example will be given to explain the operation of the device, the parallel combination of such devices constitutes no problem at all.

In the device according to the invention certain standards can be fulfilled, which for the time being are indicated only by way of example, so as to better define the difficulties which are solved by the invention and which are determined for the greater part by what must be achieved:

The device must operate automatically.

The phase deviation between the line synchronization signals must be smaller than or equal to 100 ns.

The control must enable synchronization between the generator of a fixed station and the generator of a camera which, for example, is carried by a moving body displacing at a speed in the order of 2 to 3,000 km./h.

The largest distance between the movable body and the fixed station may lie in the order of 3,000 km.

The information regarding the errors, correction or the control of the synchronization signal generator must be transmitted over a telephone line (pass band 300 to 3,400 c./s. at 3 db.).

The synchronization connexion must be insensitive to noise.

The complete video signal received by the fixed station must always be interlaced.

The device must operate in a temperature range between −40° C. and +80° C.

A signal regarding any signal transmission to the aerial must be capable of being transmitted through the synchronization path, a connexion with speech frequency being provided for transmitting the orders from the fixed station to the operator.

The greatest problem which results from this assembly of requirements relate to the stability.

As regards the introduction into the loop of the variable transit times, especially resulting from the application of telephone routes, coding and decoding circuits and also from the variation in distance between the car and the camera, it can easily be established that a strong tendency to oscillating will occur in the loop.

A solution to this problem consists in never closing the loop, that is to say, carrying out the comparison only when the correction resulting from the preceding comparison has been carried out and received on the comparison device, the "quantity" of correction being invariably smaller than the distance between the two series of signals.

A similar arrangement is described in British Pat. No. 1,074,824. This patent specification described a double control in phase and in frequency, the frame control being obtained by using the constant ratio of the number of lines per frame. The phase control is obtained by varying the counting capacity of two parallel arranged counters with feedback coupling. In this manner a variable frequency division is obtained which acts upon the phase, the maximum correction to be thus obtained being 18 ns per image. Parallel to it and is the most elaborate version frequency control is obtained by varying the bias of a variable capacity diode which bias is derived from a potentiometer controlled by a stepping motor.

It follows from the conception of the system described that this is not destined for destined for synchronizing a mobile camera moved at a certain speed since the corrections introduced are of too little importance to be able to correct both frequency and phase variations of particular values.

On the contrary one'system described responds to the problem of synchronization of remote sources. In addition said device, even when varying the value of the corrections possible to be provided, cannot be realized in a lightweight construction and the camera and its control device cannot be carried on one's back. Particularly as regards the frequency control a temperature-stabilized oscillator for transmitting color signals is necessary with a precision in the order of $10^{-9}$ which is poorly suitable for incorporation in a portable equipment. If furthermore a larger speed in correcting the frequency is desirable, the number of taps of the potentiometer and corresponding circuits must be multiplied.

The present invention avoids these drawbacks and permits of controlling an assembly of cameras which can operate under the above-described conditions, which assembly of circuits on the camera side can be carried by one operator.

According to the invention, the control device comprising a frequency, phase and frame control is characterized in that the phase correction is effected by a mixed analog-to-digital circuit, the analog part of the circuit comprising N output terminals at which N signals with different phases occur, said terminals being connected to one common point through N switches, said switches being controlled by the digital part of the circuit in order to obtain at the common point a signal having a phase which differs from that of the input signal. According to a further feature of the invention one switch is closed at a given instant. According to a further feature of the invention the number of output terminals is three. According to still a further characteristic feature of the invention the rhythm with which one of the N switches is closed or opened exceeds the transfer time of the synchronization signals and correction signals.

The rhythm is preferably equal to the period of the picture frame, namely 1/50 sec.

In order that the invention may be readily carried into effect it will now be described in greater detail, by way of example, with reference to the accompanying drawings, in which FIG. 1 shows a block diagram of a device according to the invention.

FIG. 2 is a circuit diagram of an analog-to-digital circuit which is used as a phase shifter.

FIG. 2*a* shows series of signals present at special points of the phase shifter.

Figure 1:
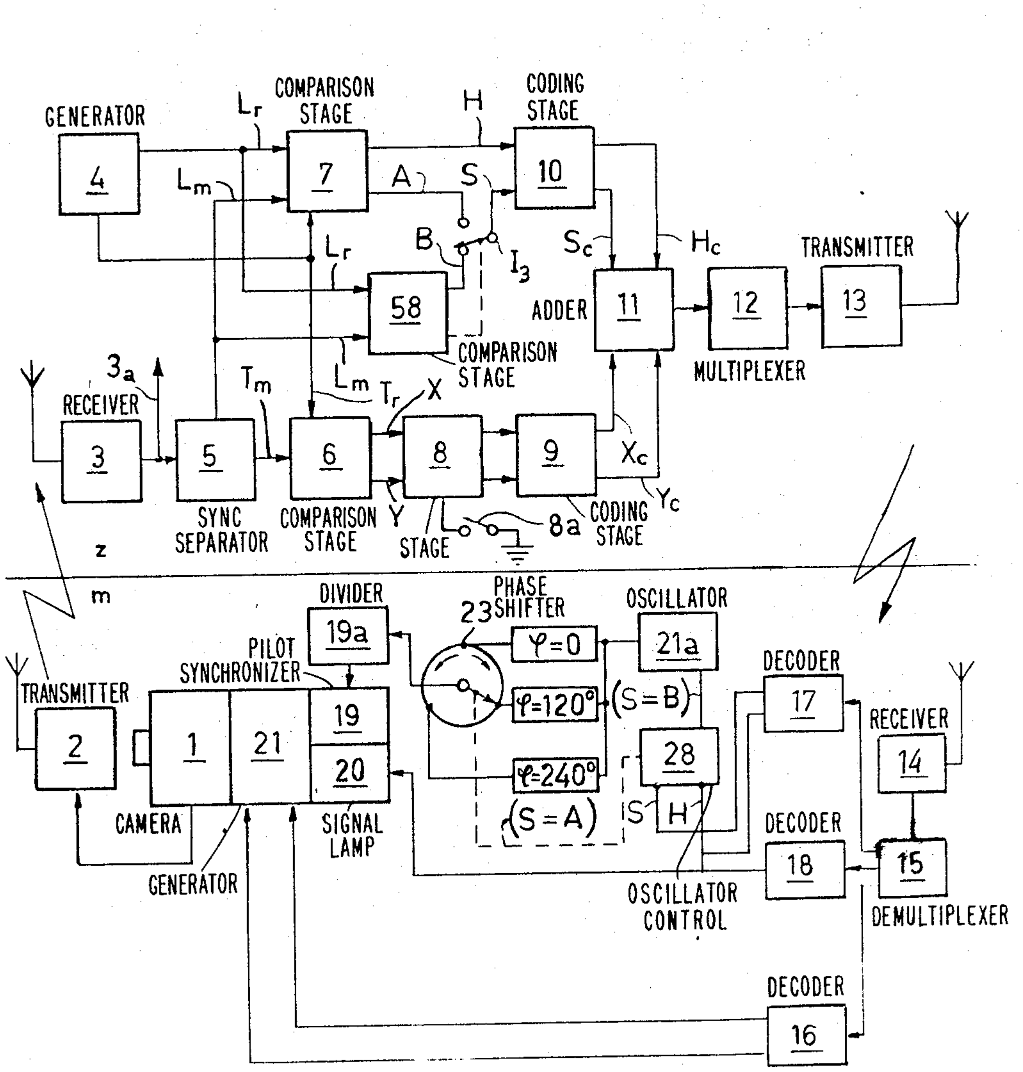

The operation of the device shown in FIG. 1 is as follows:

establishing the frequency establishing the phase establishing the frame.

Referring now to FIG. 1, a camera 1 supplies an image signal to a transmitter 2 which can supply a video signal to a receiver 3. The video signal is transferred in normal manner to the main transmitter through a line 3*a*. The object of the horizontal line which divides FIG. 1 into two parts is to distinguish between the elements in the reporting car (general reference *r*) and the elements which accompany the mobile camera (general reference *m*). The part of the video signal not transmitted through the line 3*a* is conveyed through a separator 5 which passes only the synchronization signals and divides them into frame and line synchronization signals. The signals thus separated are applied to comparison stages 6 and 7 for the frames and lines, respectively. To the comparison stages 7 and 6 are also applied the line comparison signals Lr and the frame comparison signals Tr derived from a generator 4.

As regards the frame part two binary signals and Y result from this equation which denote according to a suitable code the three possible states of the signals Tm relative to the signals Tr: leading, lagging, synchronization. As is known, an extra state can be expressed with a set of two pieces of information. Practically this possibility is used to obtain in the device information regarding the signal transfer to the aerial (by means of a signal lamp or other signalling device), which informs the operator that the scene picked up by the relative camera is transmitted to the main transmitter. This information is obtained by closing a switch 8*a* and introducing the information in a stage 8. The two pieces of binary information X and Y are coded in a coding stage 9 which supplies coded information Xc and Yc in the form of pulses occurring with a frame frequency during a time of 5 m. sec. clipped from the sinusoidal waves. The coded frame information together with the coded line information is applied to a linear adder 11 and multiplexed at 12 so as to enable the transmission thereof through a transmission path having a narrow pass band. The whole of correction information is transmitted by a transmitter 13 which may be a radio transmitter which operates, for example, at a frequency of 32 mc./s. The connection between the transmitter 13 and a receiver 14 may also be a telephone cable connexion.

As regards the line control, the procedure of forming and transmitting the correction signals is analogous with the exception that the transmitted signal is either a signal for frequency control or a signal for phase control (both controls are commutatable). The line comparison signals Lr of the generator 4 and the signals Lm of the mobile camera are compared in the comparison stage 7.

If the error is smaller than a television picture point, that is to say smaller than a time duration of 100 ns corresponding therewith, no signal is transmitted. Parallel with the comparison in the comparison stage 7 a comparison in a stage 58 takes place which acts upon the switch $I_3$ to bring it in a suitable stage dependent upon the difference value between the comparison signals and the signals supplied by the mobile camera. If only a phase correction is necessary, the comparison stage 7 supplies two pieces of binary information A and H. In the opposite case A is replaced in information B, in which the pair H, B effects the frequency control. In FIG. 1 the information A or B is denoted by S. The information H and S is coded in the coding stage 10 which transforms the two pieces of information in sinusoidal pulse trains which are cut off by the pulses H and S in which these sinusoidal pulses naturally have the frequencies which differ from that of the signals X and Y. The assembly is applied to the adder 11, multiplexed at 12 and, as described above, transmitted by the transmitter 13. The correction information is received by the receiver 14. The demultiplexer 15 again restores the various frequencies which appear at the area of the stage 11 and separates the signals into three pieces of information, namely the line, and the frame and the signalling information.

The frame information is decoded by the decoder stage 16 which restores the two pieces of information X and Y. This information is used for varying the counting capacity of a counter which according to the synchronization process supplies two frame pulses every 625 lines. According to the present invention the said counter affords the possibility of counting 623 or 627 lines in accordance with the fact whether the frame signals of the mobile camera lead or lag in phase relative to the signals Tr. As a result of the staggering of two lines an interlaced picture can always be maintained. Of course the number of 625 is restricted to the standard used and may be varied. The operation and construction of an *n*-divider with variable adjustment are described in French Pat. No. 1,529,710.

By a decoding stage 18, for example, a signalling lamp 20 can be ignited which warns the operator that signal transmission to the aerial takes place. An oscillator of a generator 21 is denoted by 21*a*. In accordance with the information supplied by a decoding stage 17 a control stage 28 acts upon the establishment of the frequency of the oscillator 21*a*CS=B) or (S=A) on the phase of the signals supplied by 21*a* through the intermediary of a phase shifter 23 the operation of which will be described in detail below. After dividing the pilot frequency in a division stage 19*a* the frequency 2 F1 (double line frequency) required for a pilot synchronization stage 19 is obtained.

Figure 2:
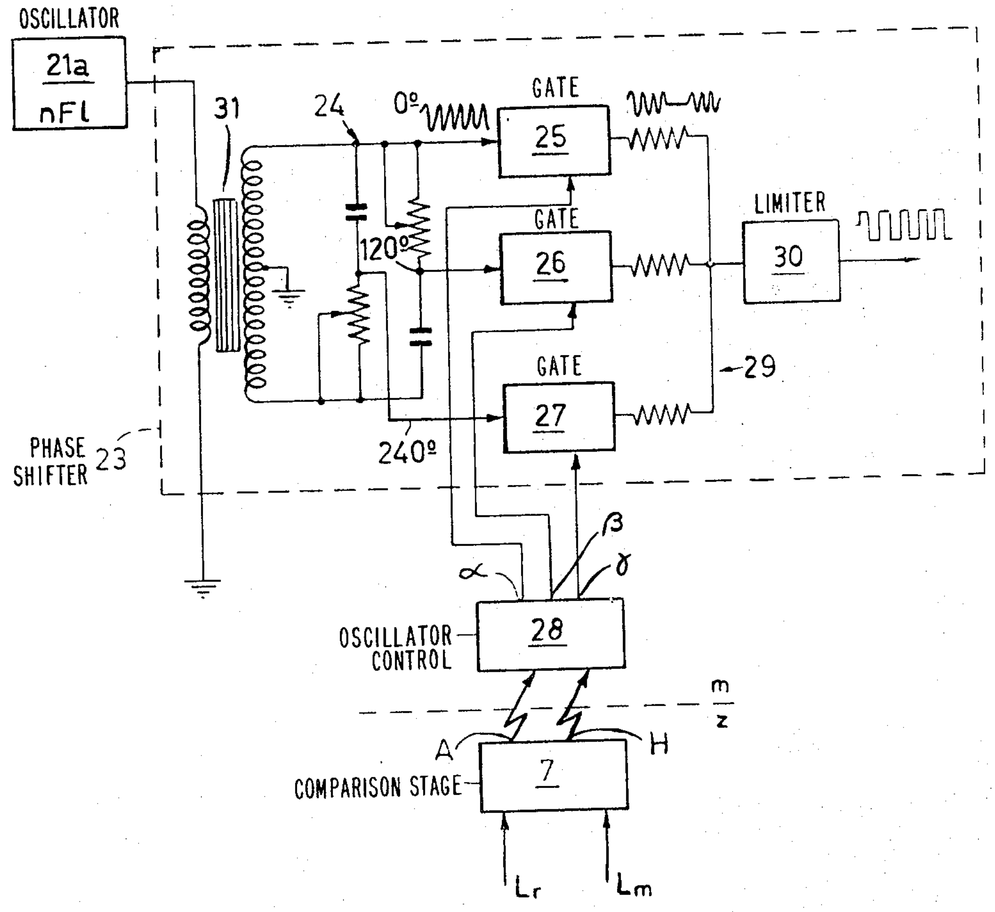

The phase shifter 23 shown in FIG. 2 is a device which is capable of giving a signal a phase step, that is to say, a certain leading or lagging in phase. On the basis of the information supplied by the comparison stage 7(S=A) the phase shifter 23 will give to the signal supplied by the oscillator 21*a* with a frequency *n*F1 a leading or lagging in phase which may vary stepwise, every step being equal to a shift in time of $$\psi = 1/N\,n\,Fl$$

where $N$ is the number of states of the phase shifter 23. If, for example, the value 100 ns is used for $\psi$, which in television corresponds to an image point, and a number of states equal to three, the frequency value of the oscillator 21*a* is equal to:

$$n\,Fl = 1/N\psi = 1/3.10^{-7} = 3.33\ 10^{6}\ \text{c./s.}$$

With the chosen standard:

$$Fl = 15\ 625\ \text{c/s},$$

$n$ may be equal to 200 which gives for $n\ Fl$=3.1250 mc./s. Thus for a given line frequency a value $\psi$ is obtained which depends upon the product $Nn$. For practical reasons the number of taps or states of the phase shifter 23 should be minimized. According to a preferred embodiment of the invention the number of states is three so that the direction of rotation of the phase shifter 23 can be determined. At the output of the phase shifter 23 a signal appears with frequency $nFl$ the phase of which can vary stepwise. After division of the frequency by $n/2$ a signal of the frequency 2 $Fl$ is obtained which is applied to the pilot synchronization stage 19 of the camera. As will be described below the phase shifter 23 enables a line control with a theoretical accuracy of 100 ns.

FIG. 2 shows the phase shifter 23 mainly consisting of a phase shifting circuit 24 which supplied voltages which are shifted in phase by 0°, 120° and 240°, respectively, and of three switches or gates 25, 26 and 27 which pass or do not pass the signal of frequency n F1 in which two gates (choppers) never pass simultaneously. The control stage 28 which receives the information A and H influences the gates 25, 26 and 27 in such manner that these become conductive or not conductive when signals $\alpha$, $\beta$ and $\gamma$, respectively, are applied to their input. With an adder 29 and a limiter 30 signals can be obtained which are capable of controlling a counter of the type as described in the above-mentioned French patent. The phase shifting circuit 24 is coupled to the oscillator 21*a* through a transformer 31, the central point of the secondary winding being connected to ground so that at the terminals of the secondary winding symmetrical voltages can be obtained. The actual phase shift is obtained by means of RC circuits.

Figure 2A:
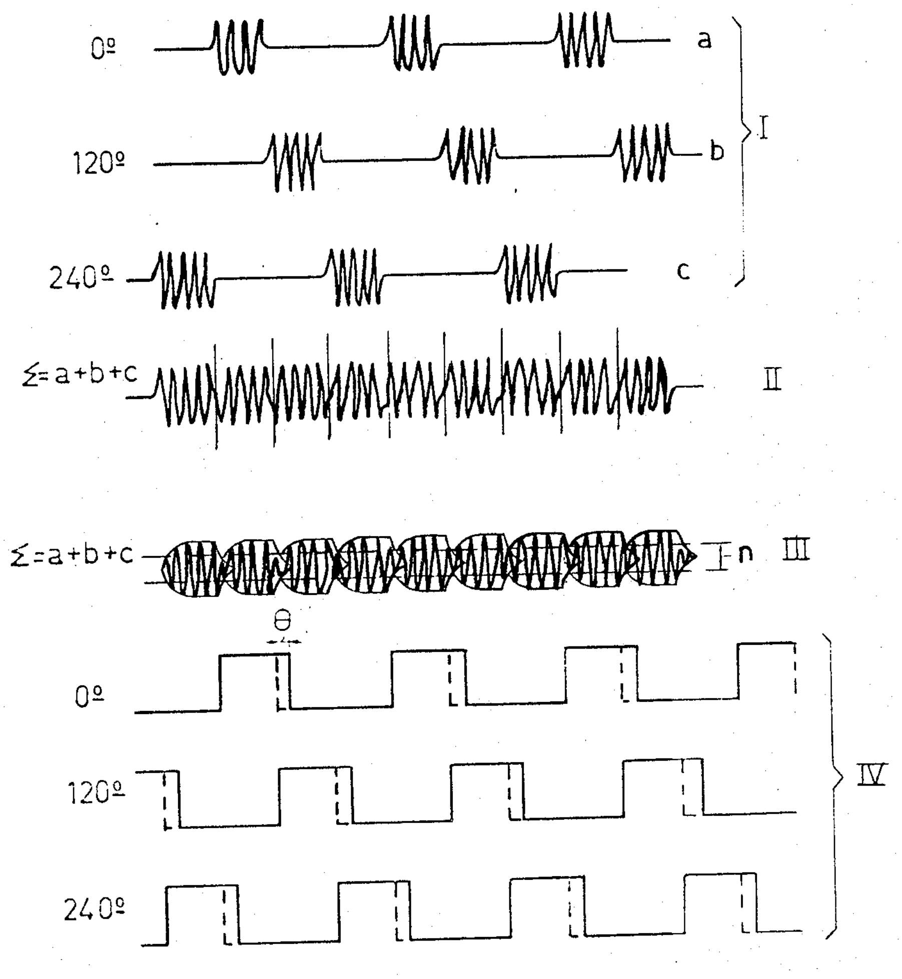

FIG. 2*a* shows the various signals supplied by the phase shifter 23.

At the signals *a*, *b* and *e* are the signals obtained at the output of the gates 25, 26 and 27 when the phase shifter 23 "-turns" in the direction 0°, 120° and 240°.

At II the signal is shown which is obtained by adding the signals *a*, *b*, and *c* before filtering is carried out, that is to say, in the junction of the resistors in the adder 29.

At III the same signal is shown after filtration, *n* denoting the cutoff level which must not be exceeded. The signals proper are surrounded by a fictitious envelope. The envelope of the output voltage is improved by shifting the trailing edge of the switching signals by a value $\theta$ so that a pulse elongation is obtained as is shown at IV.

The signal appearing at the output of the limiter 30 is destined to control a counter, that is to say, that the form of the signal is of less importance than the number of times this signal exceeds a given voltage level. For that purpose a number of measure should be taken in particular in switching from one path to the other. The interferences occurring are clearly shown in the diagram II of FIG. 2*a*. The gates or switches in fact do not operate instantaneously and the steepness of the edges of the signals should be taken into account. At the instant of commutation the resulting signal will be the resultant of, for example, the signal 0° and the signal 120°. Since the composition is uncertain this should be expressed by an additional pulse or the default of a pulse. In order to mitigate this drawback the signal at the output of the adder 29 is passed through a bandfilter (not shown) which is arranged between the adder 29 and the limiter 30 and the trailing edge of the signals (see IV) is shifted so that at the instant of commutation the sum of a decreasing voltage (corresponding to a lag in phase of, for example, the signal with phase 0°) and an increasing voltage (corresponding to the lead in phase of, for example, the signal with phase 120°) is obtained.

In this manner a continuous phase variation is obtained. However, this requires an accurate and stable threshold for, due to the dissipation in the circuits and the steepnesses of the edges, the logical circuits operate best in the saturation condition. Thus a square-wave voltage is obtained at the output of the limiter 30 the phase of which varies continuously between two taps of the phase shifter 23.

Figure 3:
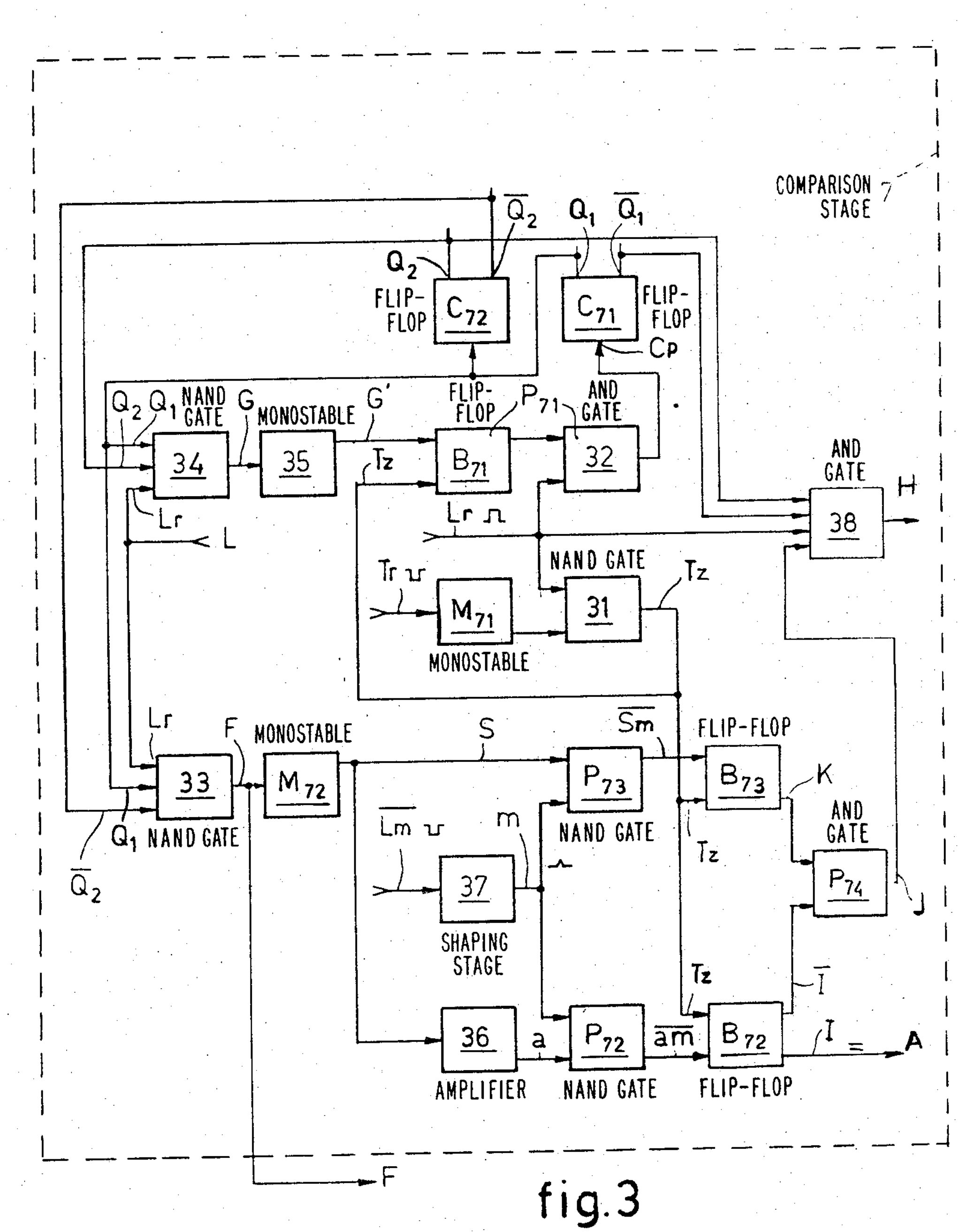
FIG. 3 shows a diagram of a comparison stage for establishing the lines.

FIG. 3 shows the connection diagram of the various elements used in the line comparison stage 7. To the input of the stage 7 are applied on the one hand the signal *Lr*, the synchronization comparison signal originating from the generator 4, and on the other hand the signal *Lm*, the synchronization signal originating from the mobile camera. The comparison is effected in three times.

A pulse Tz permits of resetting the comparison stage 7 to zero with a rhythm which preferably corresponds to the period of the frame signals, for example, 1/50 sec. The comparison is carried out in a following time and the information resulting from this comparison is stored. Finally the information is applied to the control circuit. The correction information will be expressed by three different orders. When the signals *Lr* and *Lm* are in phase, the comparison stage 7 will supply no order at all. When the signals Lm lead in phase with respect to the signals *Lr*, the comparison stage 7 will give the order "forward" and in the opposite case the order "backward." In order to give these orders it is desirable to obtain at the output of the comparison stage 7 a piece of digital information A and a clock pulse H. For example, the following code may be used:

| | | |
|---|---|---|
| Retain | A = 0 | H = 0 |
| Forward | A = 1 | H = 1 |
| Backward | A = 0 | H = 1, |

H=O denoting the absence of H and H=1 denoting the presence of H.

First a rhythm pulse Tz is produced. By means of the leading edge of the frame comparison signal a monostable circuit $M_{71}$ is impulsed which returns to its stable stage after 48 μsec. The rhythm pulse Tz is obtained by carrying out the logical operation NOT-AND or NAND:

$$T_z=\overline{M_{71}\cdot Lr}$$ (in a gate 31).

With the signals Tz the comparison stage 7 can be periodically reset to zero every 20 msec. With a signal Tz a gate $P_{71}$ is opened which consists of an asymmetrical flip-flop $B_{71}$ and an AND-gate 32. The AND-gate 32 supplies clock-pulses $C_p$ which are applied to the input of $C_{71}$. During the opened condition of the gate $P_{71}$ a counter consisting of the flip-flops $C_{71}$ and $C_{72}$ counts three clock-pulses $C_p$ and is reset to its original state at the fourth clock-pulse by the signal G′ which closes the gate $P_{71}$. Thus a comparison pulse *F* is obtained by carrying out the logical operation:

$$F=\overline{LrQ_1\cdot Q_2}$$

in a Nand-gate 33, $Q_1$ and $\overline{Q}_2$ being two signals supplied by the counters or flip-flops $C_{71}$ and $C_{72}$.

By means of F a monostable circuit $M_{72}$ is commutated for a duration of 32 μsec. At the output of $M_{72}$ a signal S is obtained which is retarded by 260 ns to give the signal *a* in circuit 36. The interval of 260 ns existing between these two signals is the uncertainty region necessary for the stability of the system. This interval is composed as follows:

100 ns correspond to the phase shift of the phase shifter 23.
40 ns correspond to the edge steepness of S
40 ns correspond to the edge steepness of *a*
80 ns correspond to the value of the test pulse.

So the test pulse cannot oscillate on either side of said uncertainty region. Pulses *G* are obtained in a NAND-gate 34 which effects the logical operation $$G=Lr\cdot Q_1\cdot Q_2$$

The pulses G′ are obtained by delaying G in a monostable circuit 35 by 2 μsec. As stated above these pulses G′ are applied to the input of $P_{71}$.

The necessary pieces of information A and H may then be formed. The information A is supplied by an asymmetrical flip-flop $B_{72}$ which is periodically reset to zero by the rhythm pulse $T_z$. Furthermore the flip-flop $B_{72}$ is controlled by the signal $\overline{am}$, *m* being a line synchronization signal of the mobile camera which is given the shape of a very fine pulse in the stage 37. Furthermore a piece of information K is generated by applying to a flip-flop $B_{73}$ the signals Tz and $\overline{S\cdot m}$, $\overline{S\cdot m}$ being obtained by the logical operation $\overline{Sm}=\overline{S\cdot m}$ carried out in the NAND-gate $P_{73}$.

The signal K originating from $B_{73}$ is equal to one or to zero. It is applied to a NAND-gate $P_{74}$ together with the signal $\overline{I}$ of $B_{72}$ which is the inverse of A. It is found that in accordance with the condition at the inputs $\overline{I}$ and K a clock pulse J will be supplied or will not be supplied. These pulses J are then applied to an AND-gate 38 together with Lr, $\overline{Q}_1$ and $Q_2$. The gate 38 supplied the information H. In practice three cases occur:

In the case I the signals Lr and Lm are in phase.

The signal *m* falls in the uncertainty region, $\overline{am}$ always remains equal to 1 and the flip-flop $B_{72}$ remains in the original condition, so:

$$I=A=0.$$

Furthermore the gate $P_{73}$ forms the signal $\overline{Sm}$ so that K=1. The gate $P_{74}$ supplies the signal $J=\overline{\overline{I}\cdot K}=0$, so H=0. The clock pulse is absent. This is the stop signal A=0 H=0. The signals Lr and Lm are in phase and no correction information is transmitted.

When Lm lags in phase with respect to Lr (case II) the signal *m* falls on the right-hand side of the uncertainty region and the signal $\overline{m}$ occurs at the output of gates $P_{73}$ and $P_{72}$. The flip-flops vary their condition, so I=A=1. At the output of the gate $P_{74}$ $J=\overline{\overline{I}K}=1$ occurs, so H=1; there is a clock pulse. The comparison is carried out and the first pulse Lr after the instant of comparison, that is to say the clock pulse, leaves the comparison stage 7. The transmitted order A=1 H=1 is the order "forward."

When Lm leads in phase with respect to Lr (case III) the signal *m* falls on the left-hand side of the uncertainty region, $\overline{Sm}$ and $\overline{am}$ are always equal to 1, the flip-flops $B_{72}$ and $B_{73}$ remain in the initial condition, so I=A=0, $J=\overline{\overline{I}.K}=1$, H=1, that is to say, the order "backward."

The information obtained is used for controlling the phase shifter 23 with the intermediary of a control stage 28 for the gates 25, 26, 27 (FIG. 2) which in fact is an invertible digital counter with three states, in which flip-flop (Master Slaves) of the type described in the above-mentioned patent application are used. These flip-flops comprise inputs $S_1$ and $C_1$ in which, upon arrival of the clock pulse, voltages can be injected which determine, if required a condition variation of the flip-flop.

Figure 4:
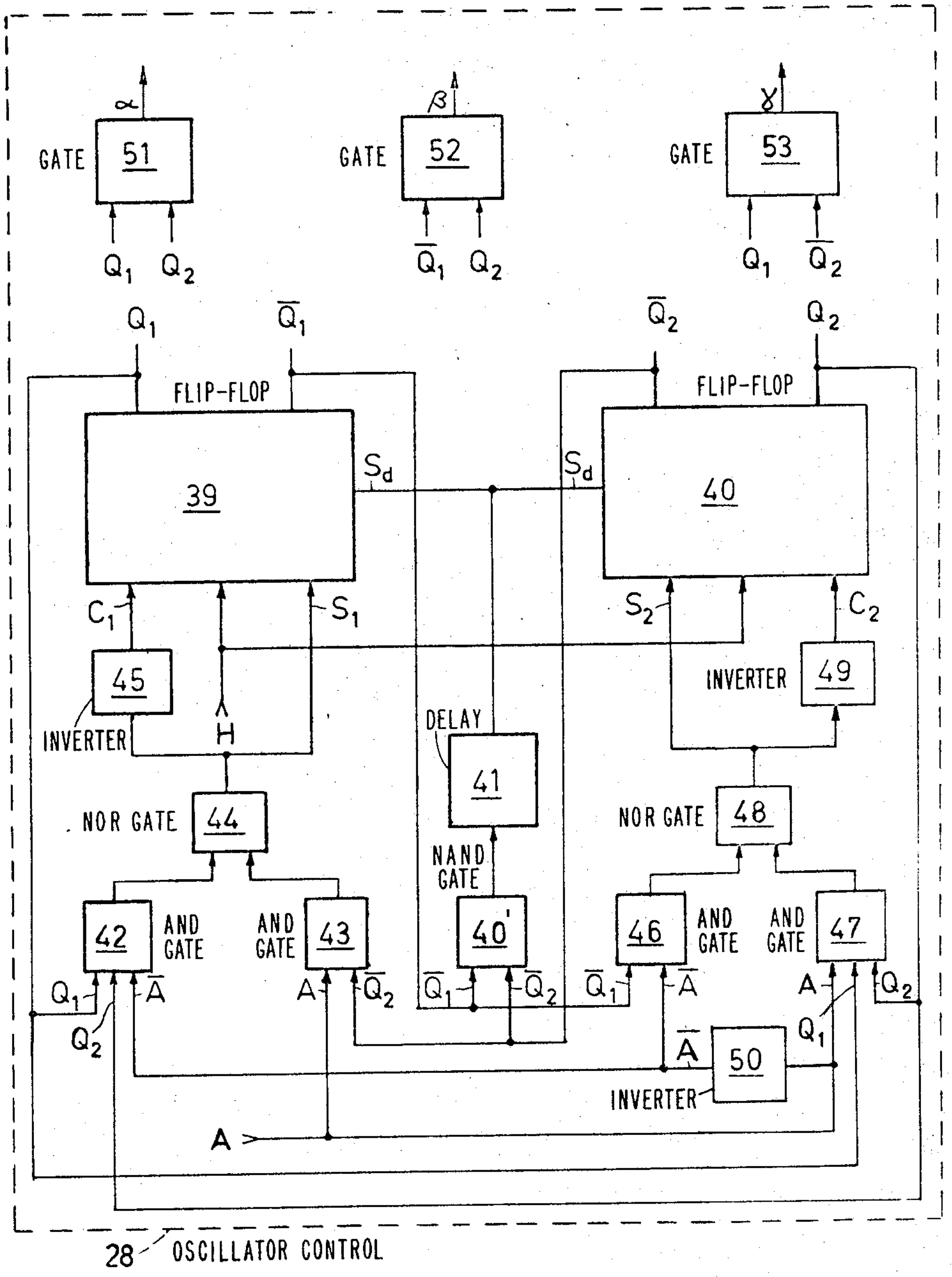
FIG. 4 shows a diagram of a control stage for the phase shifter.

FIG. 4 shows the complete diagram of the control stage 28 constructed as an invertible digital counter and the circuits by which the phase shifter 23 can be controlled by means of the information α,β and γ. As described above the line comparison stage 7 supplies information A and H by which the direction of the phase shift between the signals Lr and Lm can be established.

It is known that the two outputs of a flip-flop (Master Slave) two complementary signals Q and $\overline{Q}$ can be obtained. The control stage 28 comprises two flip-flops (Master Slaves) 39 and 40 the outputs of each of which are denoted by $Q_1$, $\overline{Q}_1$, or $Q_2$, or $\overline{Q}_2$.

The various states which can be taken by the flip-flops 39 and 40 during their action as digital counters are as follows:

| H | 39 $\overline{Q}_1$ | $Q_1$ | 40 $\overline{Q}_2$ | $Q_2$ |
|---|---|---|---|---|
| 0 | 0 | 1 | 0 | 1 |
| 1 | 1 | 0 | 0 | 1 |
| 2 | 1 | 0 | 1 | 0 |
| 3 | 0 | 1 | 1 | 0 |
| 4 | 0 | 1 | 0 | 1 |

The numbers shown in column H denote the sequence of condition. In practice only three conditions are necessary and one of them will be suppressed, for example, the state 2 (1,0 1,0).

Besides the clock pulses H information C and S is applied to the input terminals which are denoted by index 1 for the flip-flop 39 and by index 2 for the flip-flop 40. The complete table, taking into account the code of the inputs S and C, will hence be as follows:

| | H | | Flip-flop 39 (1) $S_1C_1\overline{Q}_1Q_1$ | Flip-flop 40 (2) $S_2C_2\overline{Q}_2Q_2$ |
|---|---|---|---|---|
| direction | 0 | 0° | 0 1 0 1 | 1 0 0 1 |
| "backward" | 1 | 120° | 1 0 1 0 | 0 1 0 1 |
| | 2 | 240° | 1 0 0 1 | 1 0 1 0 |
| | 3=0 | 0° | 0 1 0 1 | 1 0 0 1 |
| | 0 | 0° | 1 0 0 1 | 0 1 0 1 |
| direction | 1 | 240° | 0 1 0 1 | 1 0 1 0 |
| "forward" | 2 | 120° | 1 0 1 0 | 1 0 0 /1 |
| | 3=0 | 0° | / 0 0 1 | 0 / 0 1 |

This table permits of making the logical comparisons of the circuits which supply the information S and C, it being noted that $S=\overline{C}$.

The information A and H is applied to the input of the control stage 28. Gates 42, 43, 44, 46, 47 and 48 constitute the logical control circuits associated with the flip-flops 39 and 40. The signal A acts directly on an input of the AND-gate 43 and 47. After inverting in the inverting stage 50 the signal $\overline{A}$ acts upon the AND-gates 42 and 46. The other inputs of the gate 42 are connected to $Q_1$ and $Q_2$, the second input of the gate 43 is connected to $\overline{Q}_2$, the second input of the gate 46 is connected to $\overline{Q}_1$ and the remaining inputs of the gate 47 are connected to $Q_1$ and $Q_2$. The signal at the output of gate 42 is:

$S_{42}=Q_1\cdot Q_2\cdot\overline{A}$

The signal at the output of gate 43 is:

$S_{43}=A\cdot\overline{Q_2}$

The NOR-gate 44 effects the operation $S_1=\overline{A\cdot Q_1\cdot Q_2+A\cdot Q_2}$ The complement $C_1$ of $S_1$ is obtained by inverting in an inverter stage 45.

Similarly it is obtained in the control circuit of the flip-flop 40 at the output of the NOR-gate 48 that $$S_2=\overline{A\cdot Q_1+A\cdot Q_1\cdot Q_2}$$

and the complement $C_2$ of $S_2$ occurs through an inverter stage 49.

The information Sd for resetting to zero is obtained by applying the signals $\overline{Q}_1$ and $\overline{Q}_2$ to the terminals of a NAND-gate 40', the gate 40' supplying the signals $S_{40}=\overline{Q_1\cdot Q_2}$ which is delayed in the stage 41 which stage may be, for example, a monostable circuit, in order to supply the signal $Sd=\overline{Q_1\cdot Q_2}=\overline{Q}_1+\overline{Q}_2$. with this logical operation the condition 2 can be eliminated.

The information $Q_1$, $\overline{Q}_1$ and $Q_2$, $\overline{Q}_2$ is applied to the gates 51, 52, 53 which supply the information $\alpha$, $\beta$ and $\gamma$ as a result of which the switches or gates, 25, 26 and 27 shown in FIG. 2 can be made conductive. In order to avoid complexity of the drawing the connections of the three gates 51, 52 and 53 forming coincidence circuits are not shown. It holds that:

$$\alpha=Q_1\cdot Q_2\ \beta=Q_1\cdot Q_2\ \gamma=Q_1\cdot Q_2.$$

The reading is effected in accordance with the following table:

| H | direction "backward" code | phase | direction "forward" code | phase |
|---|---|---|---|---|
| 0 | $Q_1Q_2$ | 0 | $Q_1Q_2$ | 0 |
| 1 | $\overline{Q}_1Q_2$ | 120 | $Q_1\overline{Q}_2$ | 240 |
| 2 | $Q_1\overline{Q}_2$ | 240 | $\overline{Q}_1Q_2$ | 120 |
| 3 | $Q_1Q_2$ | 0 | $Q_1Q_2$ | 0 |

the information A being equal to 0 or 1 dependent upon the case "backward" or "forward."

The phase control is an extremely fine control since the phase step is 100 ns which is supplied every 1/50 sec. which corresponds to a control speed or "overtake" possibility at a frequency of approximately 16 c./s.

It is to be noted that in the construction of the phase shifter 23 the nature of the phase-shifting network plays no part and, for example, three delay lines could be used which introduce delays corresponding to the phase lags of the RC circuits.

Of course, the number of taps of the phase shifter 23 may be arbitrary and is dependent upon the desired phase shift characteristic. Furthermore, and as noted above, the frequency of the signal can also be influenced by multiplication, which frequency is then divided after passing the phase shifter 23.

A further property of the phase shifter 23 is its unlimited memory in the absence of orders. Finally the phase shifter 23 presents the possibility of giving unlimited delay to a given signal. However, in a given time and at the chosen values the restoring of 100 ns per frame at a frequency of 3.125 mc./s. corresponds to a difference of 165.6 c./s. The relative value of the control speed is too low for correcting an important frequency difference. So it is necessary to combine the phase control with a frequency control. In order to obtain a rapid control, especially upon starting the device, a given frequency difference Δ FM is stored. When the signal supplied by the comparison stage 7 corresponds to an indication which is larger than this difference, A is replaced by information B which commutates the line synchronization to the frequency control and which acts upon a circuit for controlling the frequency of the oscillator 21a (FIG. 1) which preferably comprises a capacitor of high value the charge of which is variable in accordance with a direct voltage Vo which is necessary to obtain a given frequency for the oscillator. In addition to the commutation information, signal B supplies the frequency difference information which acts upon the value of the voltage Vo. Although the digital circuits used are based on simple principles, they are complicated in details.

Of course, in synchronization devices which are not vulnerable to noise, the phase shift device could be incorporated in the motor car but in view of the embodiment used the additional weight resulting therefrom is negligible.

The maximum distance over which control is possible is determined by the measuring period of the system. For significantly practical reasons this period is chosen to be equal to 1/50 sec. the duration of a frame period. This measuring period is the same for the line control and the frame control. From this choice it follows that the maximum distance at which this device can operate is:

$$D=C.T./2=3.10^8\times 2.10^{-2}/2=3{,}000\text{ Km.},$$

where *T* is the maximum transit time which corresponds to the choice of the period of the rhythm of the comparisons and *C* is the rate of propagation of the electromagnetic waves in a vacuum.

In fact, during the 20 ms. corresponding to the duration of the measuring period the information must be capable of covering a track there and back. This value is theoretical and since in practice the delays caused by the circuits are of the order of 5 ms., the maximum distance is of the order of 2,500 km.

As regards the maximum control speed there is reason to consider the influence of the frequency variations to be due to the Doppler-Fizeau effect. When the camera which is displaced at a variable speed V and an acceleration U moves away linearly from the car, in addition a frequency deviation $\Delta F=\pm 2V/CFr$ occurs under equal conditions between the comparison frequency *Fr* and the frequency *FM* in the mobile camera, *C* being the rate of propagation of the electromagnetic waves in a vacuum. This deviation depends upon the sign of *V*, that is to say, that $\Delta F$ is positive when the camera moves away from the video center, and vice versa.

Since the frequency of the frame comparison signals is much lower than that of the line signals, the influence of the Doppler effect as regards said control is negligible.

Since the maximum admissible frequency deviation is ±160 c./s. the mobile camera can displace at a speed of $$V=\frac{F\times C}{2nFm}=\frac{150\times 3\times 10^8}{2\times 3.125\times 10^{-6}}\approx 28{,}000\text{ km./h.},$$

assuming that the speed vector is parallel to the straight line between the video center and the mobile camera.

The possible acceleration of the mobile camera also influences the synchronization. The maximum possible acceleration of the mobile camera is determined by the speed of rotation of the phase shifter 23, that is to say that at the chosen values 0.1 $\mu$F can be handled by the control every 20 ms.

Consequently the phase shifter 23 can handle a variation in propagation time which is equal to $0.1/2.10^{-2}=5\mu$s./s. Taking into account the double track a variation of 2.5 $\mu$s./s. results.

The maximum acceleration which can be given to the mobile camera is $$U=C\Delta t=3.10^8\times 2.5\times 10^{-6}=750\text{ m./s.}^2,$$

that is to say $U\approx 76$ g, where *g* is gravity acceleration.

This acceleration can be given to the mobile camera until its speed is equal to the maximum speed which is allowed for the frequency control, namely during a time $t=7700/7\cong 10$ s.

The invention has been described by way of example with reference to a device for the mutual synchronization of cameras which operate according to the standard CCIR with 25 images of 625 lines per second. Of course, passing from one standard to another will present no special problems; it is sufficient to construct the various stated stages with monostable circuits and flip-flops with suitable characteristics and sufficiently rapid switching times. This also holds for the standards with low frequencies which are studied for military uses in space.

Alternatively, without departing from the scope of this invention one of the above described control devices may be used in combination with arbitrary control loops and, for example, the line control device with another frame control device.

The invention is not restricted to the mutual synchronization of an assembly of cameras at one recording place and may be used for the control of one or more controlled devices with one comparison device.

I claim:

1. A circuit comprising first and second stations, said first station comprising a source of information signals, a source of synchronization signals, means for transmitting said information and synchronization signals to said second station, said second station comprising means for receiving said transmitted signals, a standard source of synchronization signals, means for generating a periodic comparison signal between said received and standard synchronization signals, means for transmitting to said first station said comparison signal; said first station further comprising means for receiving said comparison signal, means for controlling the phase of said first station source of synchronization signals including an oscillator, means for generating a plurality of output signals from said oscillator each having a different phase, means under the control of said received comparison signal for applying said output signals in a selected order to control the phase of said first station synchronization source whereby the phases of both said synchronization sources are kept substantially equal.

2. A circuit as claimed in claim 1 wherein said period of said comparison signal is greater than the two-way transmission time between said stations.

3. A circuit as claimed in claim 1 wherein said output signals number three, said information signals comprise television signals, and the period of said comparison signals is equal to the frame time of said television signals.

4. A circuit as claimed in claim 1 wherein said information signals are television signals and further comprising means for controlling the frame rate of said television signals including a counter means for generating binary correction information.

5. A circuit as claimed in claim 1 further comprising means for controlling the frequency of said first station source of information signals including a voltage variable capacitor.

* * * * *